Figure 1:
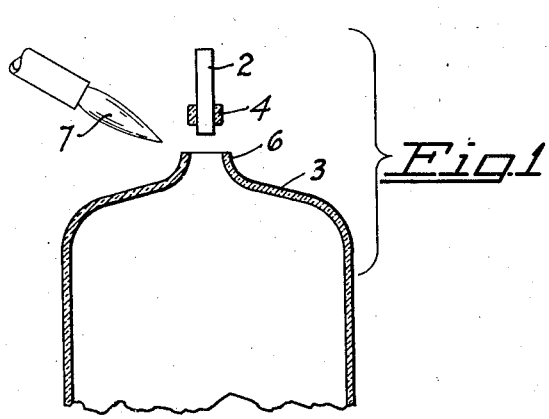

Feb. 1, 1944. W. W. EITEL 2,340,459

METHOD OF MAKING TUBES

Filed Feb. 11, 1942

INVENTOR
WILLIAM W. EITEL
BY *Charles J. Evans*
ATTORNEY

Patented Feb. 1, 1944

2,340,459

UNITED STATES PATENT OFFICE 2,340,459

METHOD OF MAKING TUBES

William W. Eitel, San Bruno, Calif., assignor, by direct and mesne assignments, to Eitel-McCullough, Inc., San Bruno, Calif., a corporation of California Application February 11, 1942, Serial No. 430,387

2 Claims. (Cl. 49—81)

My invention relates to the manufacture of vacuum tubes; and more particularly to improvements in the fabrication of tubes adapted for high frequency work.

This application covers the method of sealing an end of a lead in a tube. The article produced by my method is claimed in divisional application, Serial No. 443,637, filed May 19, 1942. The method of securing a lead to an internal element of a tube is claimed in divisional application, Serial No. 481,783, filed April 3, 1943.

It is among the objects of my invention to provide a tube having a lead of relatively large cross section extending through an envelope and having an inner end terminating close to the envelope wall to provide a short heavy lead for conducting high frequency current.

A further object is to provide an improved method of sealing a lead to the envelope.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Figure 2:
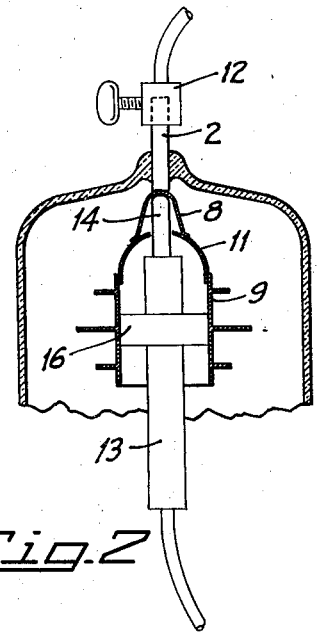
Figure 3:
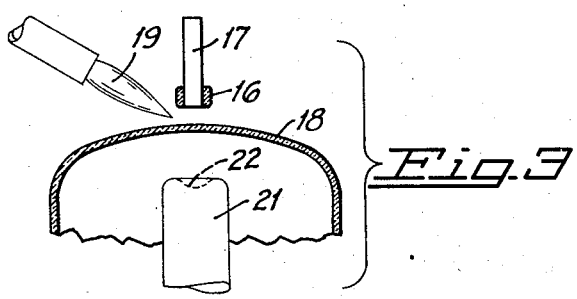
Figure 5:
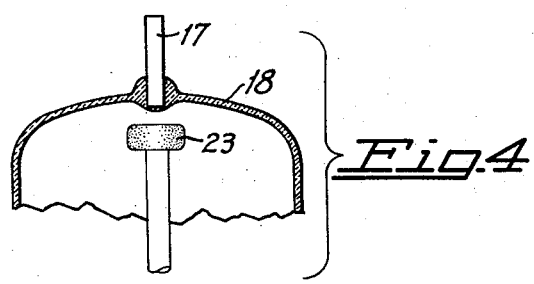
Figure 4:
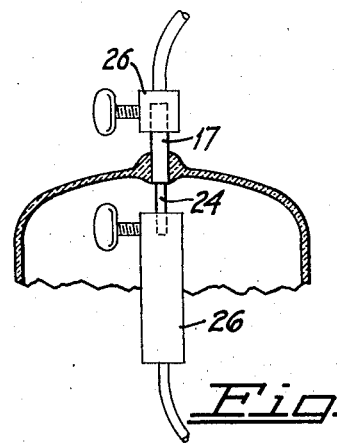

Referring to the drawing:

Figures 1 and 2 are side views, partly in section and partly in elevation showing portions of a vacuum tube illustrating the improved structure and method embodying my invention; and Figures 3, 4 and 5 are similar views illustrating a modified tube structure and method of making the same.

In terms of broad inclusion, my improved tube comprises a lead extending through and sealed to the wall of an envelope, with an end of the lead terminating close to the envelope wall; and an element fixed or welded to the short end of the lead. The method embodying my invention comprises first sealing the lead to the envelope; bringing the element into contact with the lead at one side of the envelope; and then establishing electrical connections with the element and with the lead at the opposite side of the envelope to weld the element and lead together. This method permits welding an internal element of the tube to the lead end which lies close to the envelope wall. An improved method of sealing in the lead is also provided; which comprises bringing an end of the lead into contact with a face of the envelope under heat and pressure to seal the lead to the envelope, and then removing portions of the envelope at the opposite face to expose the lead. In the tube thus constructed the end of the lead lies flush with a face of the envelope. An element is then fixed to the exposed end of the lead, preferably in accordance with my improved welding proceeding.

In greater detail, and referring to Figures 1 and 2 of the drawing, my improved method comprises sealing a relatively heavy lead 2 of suitable material, such as tungsten, to a glass envelope 3. The lead may be sealed to the envelope in accordance with the usual procedure of sealing a glass bead 4 to the lead, positioning the beaded lead in a flared opening 6 of the envelope, and then fusing the bead to the envelope by applying a flame 7, as shown in Figure 1. The bead and envelope both being of similar material, namely, glass, readily fuse together to form the seal. Any suitable glass having the desired expansion and other required characteristics may be employed for the bead and envelope. Nonex glass is preferably used for the envelope, an uranium glass is preferably used for the bead.

In order to keep lead 2 as short as possible, bead 4 is applied fairly close to the end of the lead, so that after the seal is made the inner end of the lead terminates close to envelope wall. As a comparative measure, the end of the lead preferably extends beyond the inner face of the envelope at the seal a distance not greater than the diameter of the lead.

After sealing in the lead the parts are cleaned in any suitable manner to remove oxides formed during the sealing process.

An internal element of the tube, such as anode supporting bracket 8, is then fixed to the inner end of the lead. In Figure 2 I show an anode 9 having an end cap 11 carrying the supporting bracket 8; these parts being preferably assembled as a unit ready for fastening to lead 2. It is understood however that this internal structure is merely for purposes of illustration, and that element 8 may be a support or connector for some other tube part.

Element 8 is preferably fixed to the short inner end of the lead by welding. This is accomplished by establishing electrical connections with the element and with the lead at the outer side of the envelope to pass a welding current through the element and lead. For this purpose a terminal 12 of a suitable welding circuit is secured to the outer end of lead 2. The other leg of the welding circuit is connected to an electrode 13 adapted to make contact with element 8 at a point opposite lead 2.

Electrode 13 may be of any suitable shape. For use with the anode structure illustrated, the electrode preferably has a reduced end portion 14 for insertion through an aperture in cap 11 to reach the inner surface of bracket element 8. A centering flange 16 on the body of the electrode provides means for properly positioning the anode structure. By this arrangement the prefabricated anode unit may be slipped on the end of the welding electrode and the whole moved up into the envelope to bring element 8 into contact with the end of lead 2. After making the weld, electrode 13 is withdrawn and terminal 12 is removed.

In the modified structure and method illustrated in Figures 3 to 5, a bead 16 is sealed to the extreme end of lead 17. The beaded end of the lead is then pressed into contact with the outer face of envelope 18 in the presence of flame 19; a suitable anvil 21 having a concave depression 22 at the nose being brought against the inner face of the envelope to permit application of pressure without breaking the glass. The heat fuses bead 16 to the envelope, and under pressure lead 17 sinks into the envelope wall as shown in Figure 4, leaving only a thin film of glass over the end of the lead at the inner face of the envelope.

The film is then removed, preferably by pressing a grinding wheel 23 against the inner face of the envelope below the lead. Removal of the glass film exposes the inner end of the lead, and provides a structure in which the exposed end of the lead lies flush with the inner face of the envelope at the seal. Wheel 23 also grinds the inner end of the lead to remove oxides and prepare the exposed surface of the lead for welding.

An internal element of the tube is fixed or welded to the exposed end of the lead, preferably by passing a suitable current through the element and lead in accordance with my welding procedure. As shown in Figure 5, a rod or element 24 is butt welded to the lead; suitable terminals 26 of a welding circuit being connected to the element and to the lead at the outer side of the envelope. Of course element 24 could be a supporting bracket of the character shown in Figure 2, in which case a suitable welding electrode would be employed to make the necessary connections.

I claim:

1. The method of making a tube having a metallic lead extending through a vitreous envelope, which comprises positioning the lead normal to a wall of said envelope and bringing an end of said lead into contact with a face of the envelope under heat and pressure to seal said end only of the lead to the envelope, said heat being sufficient to soften the wall and said pressure sufficient to cause penetration of the lead into the wall, and removing portions of the envelope at the opposite face to expose said end.

2. The method of making a tube having a metallic lead extending through a vitreous envelope, which comprises sealing to an end of the lead a bead of material similar to that of the envelope, bringing the beaded end of the lead into contact with a face of the envelope under heat and pressure to seal the lead to the envelope, said heat being sufficient to soften the wall and fuse the bead thereto and said pressure sufficient to cause penetration of the lead into the wall, and removing portions of the envelope at the opposite face to expose said end.

WILLIAM W. EITEL.